J. SCHLINCK.
MANUFACTURE OF SOLID FATTY SUBSTANCES FROM OIL.
APPLICATION FILED DEC. 9, 1911.

1,082,707.

Patented Dec. 30, 1913.

UNITED STATES PATENT OFFICE.

JULIUS SCHLINCK, OF HAMBURG, GERMANY.

MANUFACTURE OF SOLID FATTY SUBSTANCES FROM OIL.

1,082,707.  Specification of Letters Patent.  Patented Dec. 30, 1913.

Application filed December 9, 1911. Serial No. 664,876.

*To all whom it may concern:*

Be it known that I, JULIUS SCHLINCK, of Bierberhaus, Ernst Merckstrasse, Hamburg, Germany, a subject of the German Emperor, have invented certain new and useful Improvements in the Manufacture of Solid Fatty Substances from Oils, of which the following is a specification.

This invention relates to the manufacture of solid fatty substances, and more particularly edible fats, from oils. In this respect it is known that many metals in finely divided condition act as catalysts to effect the combination of hydrogen with unsaturated hydrocarbons and also with unsaturated fatty acids and glycerids. Nickel and palladium in particular have been proposed for this purpose, the latter in colloidal condition.

By previous processes fatty acids and fats for industrial purposes have been successfully hardened but considerable difficulties were incurred in arranging the technical process so that it could be used as far as possible continuously for the manufacture of solid edible fats from oils.

The object of the present invention is to provide such a process and it consists in passing the oil in the thinnest film and over the catalyst in the presence of hydrogen, and in such a manner that the said catalyst offers a frictional resistance to the oil, the hydrogen being supplied under pressure if necessary and in case of easily decomposable oils or fats, at a temperature ranging from 40 to 200 degrees C.

The apparatus for carrying out the above process comprises a centrifugal drum closed at the top, capable of being heated and having an inlet opening for the oil and hydrogen, perforated side walls for holding the catalyst, and a casing with discharge openings for the hydrogen overflow and for the oil.

Figure 1:
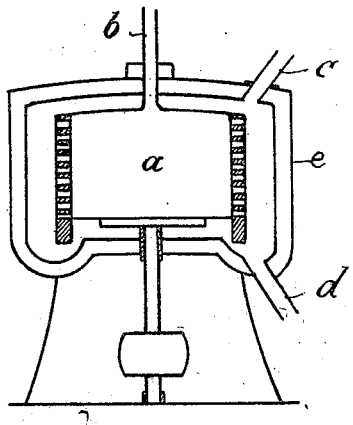
Figure 2:
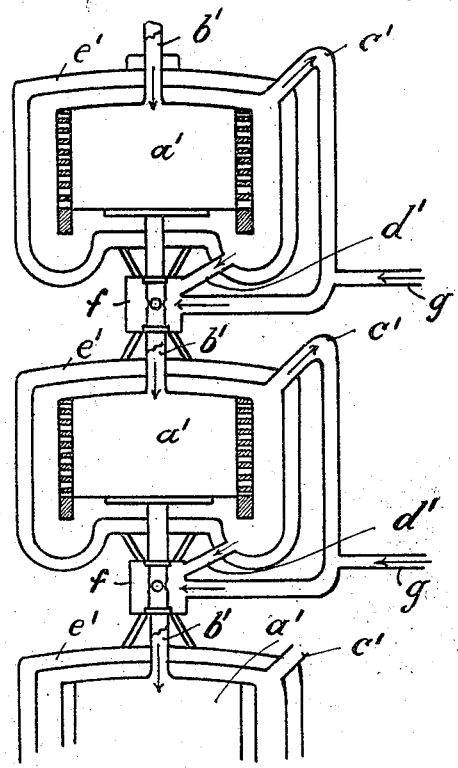

Methods of carrying out the process are shown diagrammatically in the accompanying drawing, Figure 1 illustrating a form of apparatus embodying a single centrifugal drum, and Fig. 2 a similar view of an apparatus embodying a plurality of centrifugal drums arranged in series.

With the form of apparatus shown in Fig. 1, the oil and the hydrogen are introduced through the inlet pipe $b$ into the centrifugal drum $a$ which is closed at the top and can be heated in any suitable manner as by providing a steam jacket $e$. Openings are provided in the cylindrical walls of the drum $a$ in which openings a support covered with precipitated palladium is so arranged that on rotation of the drum the oil flows outward by centrifugal force through the openings but encounters there a frictional resistance. The drum is surrounded by a casing which has an outlet opening $c$ for the hydrogen and a discharge opening $d$ for the oil or liquid fat. The temperature of the drum $a$ and its casing is so regulated that the fat is in molten condition. The oil introduced into the drum $a$ is thus driven by centrifugal force through the side walls of the drum where the oil is spread out into the thinnest film and where it simultaneously encounters a fairly substantial frictional resistance the reaction with the hydrogen takes place in the most rapid manner. The oil or fat then flows off through $d$ and according to the degree to which it is desired to harden the oil is led back one or more times into the drum by means of pumps. The hydrogen which may be introduced under pressure if necessary, and which is discharged at $c$ may also be led back into the drum $a$. The process may also be carried out in a row of such centrifugal drums arranged in series so that a uniform progression of the hardening process takes place in the successive drums. Such an apparatus is illustrated diagrammatically in Fig. 2 wherein the drums —$a'$— are all mounted on a shaft constituting the feed pipe —$b'$—. Each drum is surrounded by a jacket provided at the top with the outlet —$c'$— for the hydrogen, and at the bottom of each drum is the outlet opening —$d'$— for the oil. Both openings —$c'$— and —$d'$— lead from the jacket of one drum to the feed pipe —$b'$— of the next drum. To this end, the openings —$c'$— and —$d'$— are arranged to discharge into a chamber —$f$— surrounding the feed pipe —$b'$—. If necessary, fresh hydrogen may be fed into opening or channel —$c'$— as at —$g$—. A steam jacket —$e'$— surrounds each drum —$a'$— as in the apparatus embodying a single drum so that the drums can be heated.

The supply of the oil and the arrangement of the drums preferably takes place in such a manner that the hindmost contain the most active catalyst. By regulation of the rotational motion or by utilizing a larger or smaller number of the centrifugal apparatus the process may be so adjusted that on discharge from the last centrifugal drum the desired degree of hardening is attained. The hardening of the oil in the drum goes on with surprising smoothness.

Sesame oil is particularly suitable for the hardening. It is not necessary, in this instance that the hydrogen should be under pressure. Industrial fats and fatty acids may be hardened in a similar manner.

I claim:

1. An improved process for the manufacture of solid fatty substances, particularly edible fats, from oils, in which the oil in liquid condition and in the thinnest film is passed by centrifugal force over a catalyst in the presence of hydrogen and in such a manner that the said catalyst offers a frictional resistance to the oil, substantially as described.

2. An improved process for the manufacture of solid fatty substances, particularly edible fats, from oils, in which the oil in liquid condition at a temperature between 40 and 200 degrees C. and in the thinnest film is passed by centrifugal force over a catalyst in the presence of hydrogen and in such a manner that the said catalyst offers a frictional resistance to the oil, substantially as described.

3. An improved process for the manufacture of solid fatty substances, particularly edible fats, from oils, in which the oil in liquid condition and in the thinnest film is passed by centrifugal force over a catalyst in the presence of hydrogen and in such a manner that the said catalyst offers a frictional resistance to the oil, the hydrogen being supplied under pressure, substantially as described.

4. An improved process for the manufacture of solid fatty substances, particularly edible fats, from oils, in which the oil in liquid condition and in the thinnest film is passed by centrifugal force over a catalyst in the presence of hydrogen and in such a manner that the said catalyst offers a frictional resistance to the oil, the hydrogen being conducted through successive drums in uniform progression to act on the oil to be treated repeatedly, substantially as described.

5. An improved process for the manufacture of solid fatty substances, particularly edible fats, from oils, in which the oil in liquid condition at a comparatively low temperature and in the thinnest film is passed by centrifugal force over a catalyst in the presence of hydrogen and in such a manner that the said catalyst offers a frictional resistance to the oil, the hydrogen being supplied under pressure, substantially as described.

6. The herein described process of producing a lard substitute from oils, which consists in introducing the oil into the inner portion of a rotating structure having its engaging surfaces formed of a catalytic agent and causing the oil by centrifugal force to travel outwardly in engagement with the catalytic agent, in the presence of hydrogen, so that the catalytic agent offers a frictional resistance to the oil.

7. The herein described process of producing a lard substitute from oils, which consists in introducing the oil into the central portion of a rotating perforated drum having its oil engaging surfaces formed of a catalytic agent, and causing the oil by centrifugal force to travel outwardly through the perforated drum in engagement with the catalytic surfaces, in the presence of hydrogen, so that said catalytic surfaces offer frictional resistance to the oil.

8. The herein described process of producing a lard substitute from oils, which consists in feeding the oil in the presence of hydrogen to the inner portion of a rotating structure having its oil engaging surfaces formed of a catalytic agent, so that the oil travels outwardly in engagement with the catalytic surface due to the action of centrifugal force.

In testimony whereof I affix my signature in presence of two witnesses.

JULIUS SCHLINCK.

Witnesses:
ERNEST H. L. MUMMENHOFF,
FRANCIS R. STEWART.

Copies of this patent may be obtained for five cents each, by addressing the "Commissioner of Patents, Washington, D. C."